(12) United States Patent
Crow et al.

(10) Patent No.: US 7,456,940 B2
(45) Date of Patent: Nov. 25, 2008

(54) METHODS AND APPARATUS FOR LOCATING AND CLASSIFYING OPTICAL RADIATION

(75) Inventors: Robert Walter Crow, Pennington, NJ (US); Craig Emmanuel Loizides, Hillsborough, NJ (US)

(73) Assignee: Sensing Strategies, Inc., Pennington, NJ (US)

( * ) Notice: Subject to any disclaimer, the term of this patent is extended or adjusted under 35 U.S.C. 154(b) by 188 days.

(21) Appl. No.: 11/472,811

(22) Filed: Jun. 21, 2006

(65) Prior Publication Data

US 2007/0296970 A1    Dec. 27, 2007

(51) Int. Cl.
*G01J 3/28* (2006.01)
(52) U.S. Cl. .......................... 356/73; 356/328
(58) Field of Classification Search ............. 356/73, 356/328
See application file for complete search history.

(56) References Cited

U.S. PATENT DOCUMENTS

| | | | |
|---|---|---|---|
| 4,674,871 A * | 6/1987 | Shifrin | 356/73 |
| 4,682,888 A * | 7/1987 | Welner | 356/73 |
| 5,135,183 A | 8/1992 | Whitney | |
| 5,760,899 A | 6/1998 | Eismann | |
| 6,011,876 A | 1/2000 | Kishner | |
| 6,104,488 A | 8/2000 | LeVan | |
| 6,118,119 A * | 9/2000 | Ruschin | 356/328 |
| 6,180,990 B1 | 1/2001 | Claiborne et al. | |
| 6,882,409 B1 | 4/2005 | Evans et al. | |
| 6,917,471 B2 | 7/2005 | Shiozaki et al. | |
| 6,969,856 B1 | 11/2005 | Hillenbrand et al. | |
| 7,253,895 B2 * | 8/2007 | Kauffman et al. | 356/328 |

* cited by examiner

*Primary Examiner*—F. L Evans
(74) *Attorney, Agent, or Firm*—Law Offices of Rita C. Chipperson, P.C.

(57) ABSTRACT

Disclosed are methods and systems for locating and classifying optical sources. In one aspect, a pair of imaging spectrometers is orthogonally oriented relative to an optical axis to accommodate simultaneous creation of two diffraction profiles for each imaged optical source. Such orientation increases the accuracy of detecting diffraction profiles of interest ("DPI"), as a DPI will not be declared unless it is sensed by both spectrometers. Furthermore, the spectrometers' orientation allows data such as a two-dimensional angle of incidence to be collected from an identified DPI without identification of either DPI's $0^{th}$ order ray segment, thereby increasing the accuracy of the collected data. Such increased accuracy in both data determinations allows optical sources to be more accurately located and classified as information such as wavelength, amplitude, etc. may be calculated from the detected DPI with a greater degree of accuracy. Furthermore, false DPI detections are minimized.

18 Claims, 9 Drawing Sheets

METHODS AND APPARATUS FOR LOCATING AND CLASSIFYING OPTICAL RADIATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

BACKGROUND OF THE INVENTION

Embodiments of the present invention generally relate to methods and apparatus for locating and classifying optical radiation. More specifically, the present invention relates to methods and apparatus for locating and classifying optical radiation in which a plurality of gratings and/or detectors are orthogonally oriented to increase the accuracy of such location and/or classification.

Systems and methods are known in the art for radiation detection and/or classification. One such system is a hyperspectral system that collects information concurrently from a plurality of adjacent infrared spectral bands. A collector system includes an optical train for receiving the incoming radiation, a disperser for separating the received infrared radiation into multiple adjacent bands of interest, and a focal plane array for detecting the individual infrared bands and producing corresponding output signals. The focal plane array in this collector system is an enhanced quantum well infrared photodetector having multiple physical dimensions of each detector varied in a predetermined manner to alter the frequency of responsivity of the detector to form the multi-band pixels of the received image. Consequently, the generated output signals may be processed to review selected bands of interest or to determine if certain types of targets are present based upon the received radiation.

In another similar system, a multi-spectral detector is used to identify objects in a specific field of view. The multi-spectral detection system includes an optically dispersive element, a detector array, and an integrated circuit. The optically dispersive elements separates laser detection and ranging ("LADAR") radiation or other radiation received from a scene into a plurality of spectral components and distributes the separated spectral components to a detector array. The detector array includes a plurality of individual detectors capable of detecting the spectral components of the LADAR and scene radiation. The integrated circuit is coupled to the detector array and is capable of generating a plurality of electrical signals representative of predetermined characteristics of the detected radiation. In one use of this detector, LADAR is actively detected while scene radiation is passively detected.

In yet another similar system, a spectral detector is designed with a multi-waveband focal plane array and high efficiency gratings capable of dispersing all spectral orders with high efficiency. The high efficiency of the gratings is achieved by varying the blaze of the gratings. Radiation received by the detector passes through the high efficiency gratings prior to striking the focal plane array. This system allows spectra corresponding to overlapping grating orders to be focused onto the focal plane array to create spectral images of a scene simultaneously in multiple wavelength regions. Such detectors allow detection of spectral ranges having several octaves of wavelength while minimizing the size and cryogenic requirements of the detector.

A similar high-sensitivity multispectral sensor is also known for improving sensing in airborne hyperspectral and multispectral sensing applications such as thermal or infrared military target detection and/or identification. This sensor combines dispersive spectrometer techniques, such as those discussed above, with filtered time-delay-integrate ("TDI") detector techniques to provide improved noise equivalent spectral radiance ("NESR") by increasing dwell time, interband temporal simultaneity, and spatial registration. This sensor includes hyperspectral, multispectral, and dual-band arrangements.

BRIEF SUMMARY OF THE INVENTION

Briefly stated, in one aspect of the present invention, an apparatus for determining information related to one or more optical sources is provided. This apparatus includes at least two gratings for diffracting radiation received from an optical source, for which a first of the gratings is oriented relative to a second of the gratings such that the diffracted radiation created by a first of the gratings is rotated ninety degrees relative to the diffracted radiation created by a second of the gratings; at least two lenses, each of the lenses positioned to receive the diffracted radiation created by a respective one of the at least two gratings; at least two detectors, each of the detectors positioned to receive the diffracted radiation passing through a respective one of the at least two lenses, and at least one processing unit coupled to said at least two detectors for receiving data related to the diffracted radiation received by the at least two detectors and performing at least one of the group consisting of locally processing the data, transmitting the data for remote processing, recording the data for remote processing, and combinations thereof, wherein a first indexing system of a first of said detectors is rotated ninety degrees relative to a second indexing system of a second of said detectors.

In another aspect of the present invention, an apparatus for determining information related to one or more optical sources is provided. This apparatus includes at least two gratings for diffracting radiation received from an optical source, for which a first of the gratings is oriented relative to a second of the gratings such that the diffracted radiation created by a first of the gratings is rotated ninety degrees relative to the diffracted radiation created by a second of the gratings: at least two lenses, each of the lenses positioned to receive the diffracted radiation created by a respective one of the at least two gratings; at least two detectors, each of the detectors positioned to receive the diffracted radiation passing through a respective one of the at least two lenses, and at least one processing unit coupled to said at least two detectors for receiving data related to the diffracted radiation received by the at least two detectors and performing at least one of the group consisting of locally processing the data, transmitting the data for remote processing, recording the data for remote processing, and combinations thereof, and at least one beamsplitter for directing an equal amount of said radiation received from at least one of the group consisting of said optical source, an afocal lens, and combinations thereof to each of said at least two gratings.

In another aspect of the present invention, a method for determining information related to one or more optical sources is provided. This method includes diffracting radiation received from the optical source via at least two gratings, for which a first of the gratings is oriented relative to a second of the gratings such that the diffracted radiation created by a first of the gratings is rotated ninety degrees relative to the diffracted radiation created by a second of the gratings; transmitting the diffracted radiation onto at least two detectors, for which a first indexing system of a first of the detectors is rotated ninety degrees relative to a second indexing system of a second of the detectors; and analyzing data related to the diffracted radiation received by the at least two detectors to determine if one or more diffraction profiles of interest are present.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a diffraction profile" includes a plurality of diffraction profiles. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Figure 1:
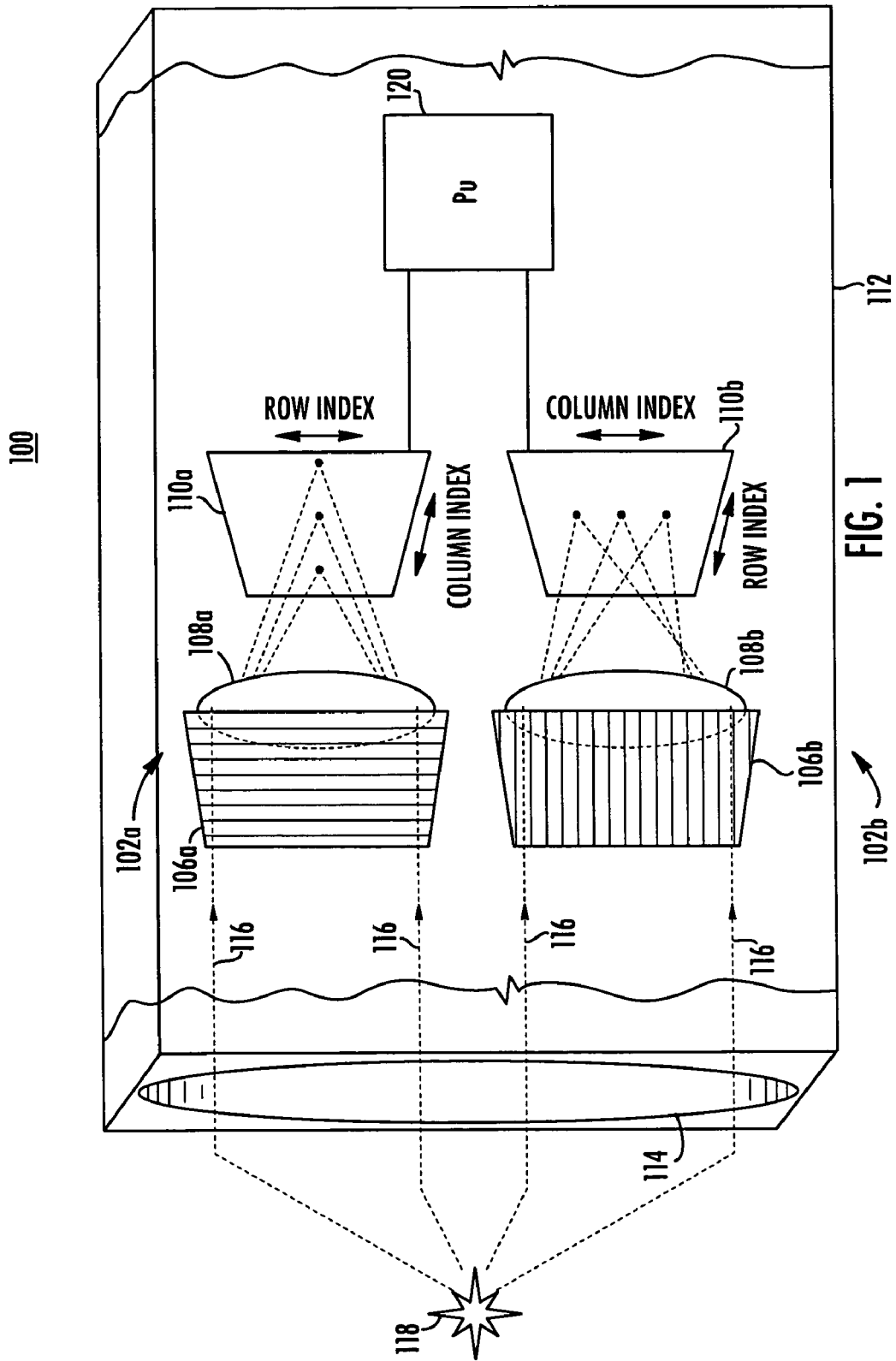
FIG. 1 depicts an exemplary apparatus for locating and classifying optical radiation in accordance with one embodiment of the present invention.

Referring first to FIG. 1, illustrated is an exemplary apparatus for locating and classifying optical radiation in accordance with one embodiment of the present invention. In one aspect of the present invention, optical radiation is located and classified via collection and analysis of optical data related thereto. Optical data may be collected using a plurality of sensors ranging from simple cameras to more complex systems.

In one embodiment of the present invention, optical data is collected via a coincident diffractometer sensor ("CDS") such as CDS 100. In the exemplary embodiment of the present invention depicted in FIG. 1, CDS 100 includes, inter alia, first imaging diffractometer sensor ("IDS") 102a and second IDS 102b. In some aspects of the present invention, such as the embodiment depicted in FIG. 1, IDS 102b is orthogonally oriented relative to IDS 102a. That is, IDS 102b is rotated ninety degrees about the optical axis with respect to IDS 102a. In some embodiments of the present invention, both grating 106b and detector 110b are rotated ninety degrees with respect to grating 106a and detector 110a, respectively. That is, the diffracted radiation created by a first grating 106a is rotated ninety degrees relative to the diffracted radiation created by a second grating 106b. Also, the indexing system of a first detector 110a is rotated ninety degrees relative to the indexing system of a second detector 110b. However, varying quantities and/or orientations of IDS 102 may be substituted without departing from the scope of the present invention.

As depicted in FIG. 1, each exemplary IDS such as IDS 102a and 102b may include, inter alia, grating 106, lens 108, detector array 110, and a dedicated or shared processing unit ("PU") 120. Also, each IDS 102 and its respective components may be contained within a dedicated or shared housing such as housing 112 having an aperture 114 through which optical radiation may pass prior to collection by IDS 102a and/or IDS 102b.

Gratings 106 receive incoming radiation 116, as generated by one or more optical sources such as optical source 118, through aperture 114. Gratings 106 are typically one of a variety of available transmission or diffraction gratings including, but not limited to, ruled transmission gratings, holographic linear transmission gratings, and the like. However, alternate gratings may be substituted without departing from the scope of the present invention.

Each grating 106 diffracts incoming radiation 116, thereby separating it into its constituent spectra. These rays of radiation 116 exit each grating 106 at an angle that is proportional to the respective ray's wavelength. Consequently, if the received radiation 116 consists of a plurality of rays having multiple wavelengths, gratings 106 will diffract each of the rays having similar wavelengths at different angles relative to the respective grating 106. More specifically, a light ray striking grating 106 at a specific angle will result in a ray exiting the respective grating 106 at the same angle which is the direct image of the source (i.e., the $0^{th}$ order ray), as well as a set of exiting rays dispersed about the $0^{th}$ order ray (i.e., diffracted rays). The diffracted rays comprise the optical spectrum of the source. Each grating 106 disperses the $0^{th}$ order ray and the diffracted rays in horizontal or vertical alignment depending upon the orientation of the respective grating 106.

Such rays (i.e., the $0^{th}$ order ray and the diffracted rays) are diffracted from gratings 106 through their respective lenses 108. In some aspects of the present invention, lenses 108 focus these rays to form a two-dimensional optical signature (i.e., a diffraction profile ("DP")) upon its respective detector 110. The resulting DPs may then be processed, as discussed in further detail below, to determine whether they were created by an optical source of interest. If yes, the DPs may be further processed to determine data such as the two-dimensional 118 of interest to perform a variety of tasks including determining a two-dimensional angle of incidence ("AOI") of the optical source of interest, determining an amplitude of the optical source, classifying the optical source, etc.

Each detector 110 converts the DP generated by the respective grating 106's diffraction of the received $0^{th}$ order and diffracted rays into digital information for further processing by a processing unit such PU 120. Such processing may range from mere data collection and/or recording for post-sensing and/or off-sensor processing to embedded processing and/or local generation of data products (e.g., location and/or classification of an optical source, sensed diffraction profiles of interest ("DPIs"), two-dimensional AOI, amplitude, and/or temperature of an optical source, etc.).

Additionally, PU 120 may be equipped with an on-board, real-time clock and may be programmed to record the time associated with optical activity. For example, each diffraction profile image generated by detector 110a and/or 110b may be stamped or otherwise recorded in combination with the time at which such image occurred. The time of occurrence of specific DPs or DPIs may aid in classification of a particular optical source, particularly if such optical source (e.g., continuous wave lasers, pulsed lasers, etc.) has radiant characteristics that change in an identifiable pattern over a period of time. However, regardless of whether the optical source has such a characteristic, the recording of time in conjunction with the detected images is a useful tool for the classification and/or location of optical sources of interest.

In one embodiment of the present invention, each detector 110 is a two-dimensional focal plane array. Such focal plane arrays consist of a plurality of individual pixels configured to form a series of rows and columns. Each pixel generates an output signal upon receiving optical radiation, thereby allowing a processing unit such as PU 120 to combine the plurality of generated output signals to create an image of the DP and perform processing related to same. Although FIG. 1 depicts detector 110 as a focal plane array, alternate detectors may be substituted without departing from the scope of the present invention.

Figure 2:
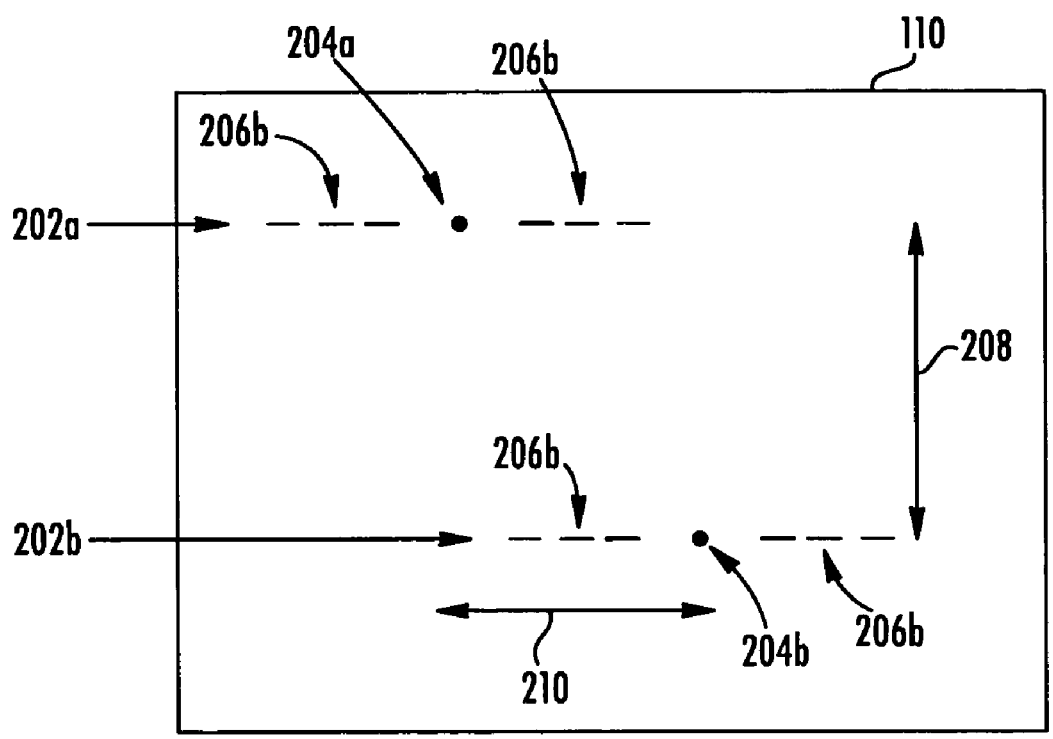
FIG. 2 depicts exemplary diffraction profiles such as those created in accordance with the present invention.

Referring now to FIG. 2, depicted is an illustration of two DPs 202a and 202b formed on a detector such as detector 110a or 110b (FIG. 1). As illustrated by FIG. 2 and as discussed above, the segments of each DP 202 are aligned. The $0^{th}$ order ray segments 204a and 204b of DP 202a and 202b, respectively, are approximately centrally located between diffracted ray segments 206a and 206b of DP 202a and 202b, respectively. In the depicted embodiment, DP 202a and DP 202b are aligned horizontally, however, such alignment may also be varied depending upon the orientation of the respective grating 106. For example, a ninety-degree rotation of the grating creating the DP will result in a vertical alignment of the respective DP 202. Such horizontal or vertical alignment causes each DP 202 to be distributed approximately along a horizontal or vertical row of grating pixels.

The angle of the $0^{th}$ order ray as it exits its respective grating such as grating 106 corresponds to the two-dimensional AOI; therefore, this AOI can be determined by isolating the pixel of the detector such as detector 110 (FIG. 1) that corresponds to the $0^{th}$ order ray segment of the associated DP ("$0^h$ order pixel"). Once the row and column associated with the $0^{th}$ order pixel are identified, determining the two-dimensional AOI is a straightforward process since the pixel rows and columns correspond to the two dimensions of the AOI, which are azimuth and elevation. Azimuth is the horizontal direction expressed as the angular distance between the direction of a fixed point, such as CDS 100, and the direction of an object such as optical source 118. Elevation is the angular distance of an object such as optical source 118 above a horizontal plane such as the horizontal plane of CDS 100. Whether the row or column of the detector corresponds to the azimuth or elevation, respectively, may be varied and depends upon the reference frame being used. However, when using the aforementioned method, accurately estimating the two-dimensional AOI is dependent upon accurately detecting the DP of interest and accurately isolating the $0^{th}$ order pixel within the DPI, the determination of which shall be discussed in greater detail below.

In addition, once the DPI and its respective $0^{th}$ order ray have been identified, the amplitude of optical source 118 may be calculated (in addition to its two-dimensional AOI). The brightness and wavelength spectrum of optical source 118 may be estimated from the DP (i.e., the $0^{th}$ order pixels as well as the higher order pixels) generated by optical source 118 on detector 110. Since the $0^{th}$ order segment present on the $0^{th}$ order pixel forms a direct image of optical source 118, its amplitude is proportional to the total received irradiance integrated over the spectral band of the sensor. Therefore, the estimated amplitude may be calculated via the following equation after the DPI and its $0^{th}$ order segment have been properly identified:

$$E = \frac{D}{\int_{\lambda'}^{\lambda''} R(\lambda)S(\lambda)d\lambda} \quad \text{(Eq. 1)}$$

wherein D is the digitized pixel value of the $0^{th}$ order pixel on the detector as measured in counts, $R(\lambda)$ is the spectral responsivity of the IDS as measured in Watts/cm$^2$/um/counts or Joules/cm$^2$/um/counts, and $S(\lambda)$ is the normalized spectral profile of the received optical rays, which is dimensionless and normalized in the sense that $\int s(\lambda)d\lambda = 1$, and wherein $\lambda'$ and $\lambda''$ are the lower and upper wavelength extents, respectively, of the responsivity of the IDS.

In situations in which the optical source being analyzed is known to be monochromatic with a wavelength of $\lambda_0$, or a wavelength of $\lambda_0$ is estimated from the DP, then $S(\lambda)$ may be determined from the following equation:

$$S(\lambda) = \begin{cases} 0, & \lambda = \lambda_0 \\ 1, & \lambda \neq \lambda_0 \end{cases} \quad \text{(Eq. 2)}$$

Consequently, equation 1 reduces to the following equation for calculating the estimated amplitude of the optical source:

$$E = \frac{D}{R(\lambda_0)} \quad \text{(Eq. 3)}$$

Such proper identification of the DPI and $0^{th}$ order segment also allows additional information such as the spectral profile of the optical source to be estimated based upon its DP. The first order component of the DP includes the spectrum of the optical source. Each pixel of the first order component of the DP includes the amplitude of the optical source at a wavelength proportional to the distance of that pixel from the $0^{th}$ order pixel as dictated by the spectral dispersion of the IDS' grating. That is, for a diffracted order pixel that is displaced by n pixels from the $0^{th}$ order ray, the wavelength coverage of that diffracted order pixel will be in a range $\lambda_n'$ to $\lambda_n''$, wherein $\lambda' \leq \lambda_n' \leq \lambda_n'' \leq \lambda''$. The estimated spectral component for this pixel may be calculated via the following equation:

$$E = \frac{D_n}{\frac{1}{(\lambda_n'' - \lambda')_n} \int_{\lambda_n'}^{\lambda_n''} R(\lambda) d\lambda} \quad \text{(Eq. 4)}$$

wherein $D_n$ is the digitized pixel value for the pixel and the denominator of this equation is the average spectral responsivity for this pixel. If all of the diffracted order pixels are evaluated based upon the above equation, the results may be combined to estimate the spectrum of the optical source. Once the spectrum has been estimated, various properties of the optical source such as wavelength and temperature may also be estimated. For example, the temperature of the optical source may be estimated by determining the Planck function that is the closest fit to the estimated spectrum. However, the aforementioned calculations (e.g., amplitude, spectral profile, temperature, wavelength, etc.) all rely on proper identification of the DPI and its $0^{th}$ order segment, the determination of which shall be discussed in greater detail below.

In the embodiment of the present invention depicted in FIG. 2, since DP 202 repositions in a manner that corresponds to a change in the two-dimensional AOI of optical source 118, the change in elevation of the two-dimensional AOI may be determined from the vertical change in position of $0^{th}$ order ray segment 204a relative to $0^{th}$ order ray segment 204b (i.e., vertical distance 208). Similarly, the change in azimuth of the two-dimensional AOI may be determined from the horizontal change in position of $0^{th}$ order ray segment 204a relative to $0^{th}$ order ray segment 204b (i.e., horizontal distance 210). Such determinations may be used to track the location of an optical source such as optical source 118 relative to a position of CDS 100.

Figure 3:
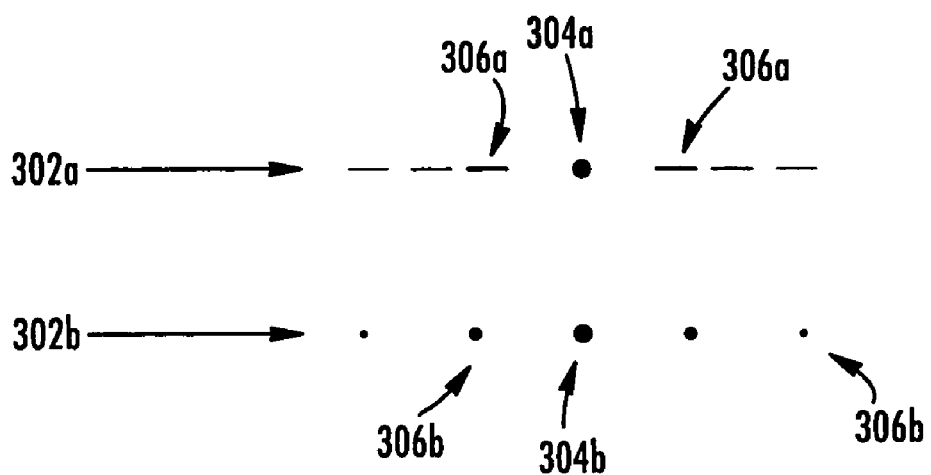
FIG. 3 depicts exemplary diffraction profiles generated by broadband and narrowband optical sources such as those created in accordance with the present invention.

Turning now to FIG. 3, in addition to aiding in location of an optical source 118 and/or radiation 116, diffraction profiles such as DP 202a and DP 202b (FIG. 2), as well as DP 302a and 302b, also aid in their classification. DP 302a depicts an exemplary DP of the radiation generated by a broadband source and DP 302b depicts an exemplary DP of the radiation generated by a narrowband source. Broadband sources (e.g., solar and thermal optical sources) radiate rays having a wide range of frequencies. In contrast, narrowband sources such as monochromatic optical sources and nearly monochromatic optical sources (e.g., lasers, sodium and mercury lamps, combustion sources with strong carbon dioxide features, etc.) radiate rays having a narrow range of frequencies (i.e., their emission spectra are dominated by a few spectral lines). As depicted in FIG. 3, broadband sources produce a DP such as DP 302a having a focused $0^{th}$ order ray segment 304a, which corresponds to the two-dimensional AOI of the optical source, that is surrounded by diffracted ray segments 306a, which appear in the respective DP as a set of streaks ("diffracted ray streaks"). Such streaks correspond to the wavelength spectrum of the broadband source. In contrast, narrowband sources produce a DP such as DP 302b having a focused $0^{th}$ order ray segment 304b, which corresponds to the two-dimensional AOI of the optical source, that is surrounded by diffracted ray segments 306b, which appear in the respective DP as a series of spots ("diffracted ray spots"). The spacing(s) between the diffracted ray spots are directly proportional to the wavelength(s) of the narrowband source and are inversely proportional to the dispersion of the respective grating. Consequently, once a diffraction profile has been accurately identified as the diffraction profile associated with an optical source of interest, the diffraction profile may be further analyzed to determine the optical source's wavelength (s), two-dimensional AOI, amplitude, etc.

In some aspects of the present invention, the classification of a DP is achieved by determining whether the DP, or one or more of the estimated characteristics of the DP (e.g., wavelength, two-dimensional AOI, amplitude, etc.), are similar to those of a DPI. For example, one or more characteristics of an optical source such as wavelength and/or temperature, as estimated from a DP created by the optical source, may be evaluated to determine whether it falls within a range of acceptable wavelengths and/or temperatures for the DPI. In other aspects of the present invention, a feature extraction process is used to classify a DP. Such processes may compare the DP to a library of optical source DPIS, and the comparison may be performed via least-squares, matched filters, or other approaches known in the art to determine which DPI most closely resembles the detected DP. That is, the feature being extracted is the potential DPI sought within the two-dimensional IDS images.

Figure 9:
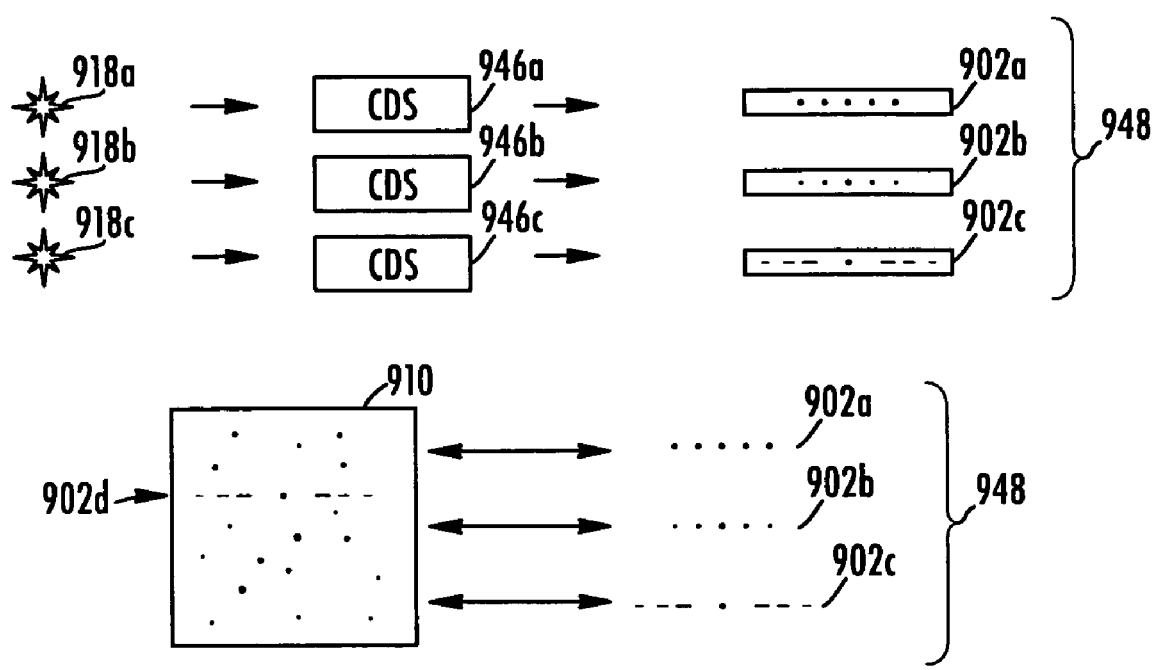
FIG. 9 depicts an exemplary feature extraction process in accordance with one embodiment of the present invention.

Referring back to FIG. 1, in one aspect of the present invention, PU 120 is programmed with, inter alia, a feature extraction algorithm capable of detecting one or more DPIs (i.e., the diffraction profiles of interest) such as an algorithm following the exemplary feature extraction process depicted in FIG. 9. Such DPIs typically vary with the particular application for which CDS 100 is being implemented.

Referring now to FIG. 9, depicted is an exemplary feature extraction process 900. In one aspect of the feature extraction process, a library of optical source DPIs is created by allowing individual optical sources 918a-918c to radiate upon CDS 946 such that DPIs 902a-902c are generated. The generated DPIs 902 are then stored together to create DPI library 948. Thereafter, DPs such as DP 902d generated upon CDS detectors such as detector 910 by potential optical sources of interest may be compared to DPI library 948 using methods such as least-squares, matched filters, or other approaches known in the art. This comparison allows process 900 to determine whether detected DP 902d matches any one of DPIs 902 included in DPI library 948. If such a match occurs, a classification of the unknown optical source may be performed by looking up the optical source of the matching library DPI. For example, as depicted in FIG. 9, the detected DP 902d matches DPI 902c. Therefore, the optical source that generated DP 902d is the same optical source that generated DPI 902c (i.e., optical source 918c). Therefore, looking up information pertaining to optical source 918c via a database, table, or the like allows the optical source generating detected DP 902d to be determined. Although DPI library 948 is depicted with three DPIs 902, any quantity of DPIs may be substituted without departing from the scope of the present invention. Additionally, alternate methods of creating a DPI library such as DPI library 948 may be substituted without departing from the scope hereof.

Figure 4:
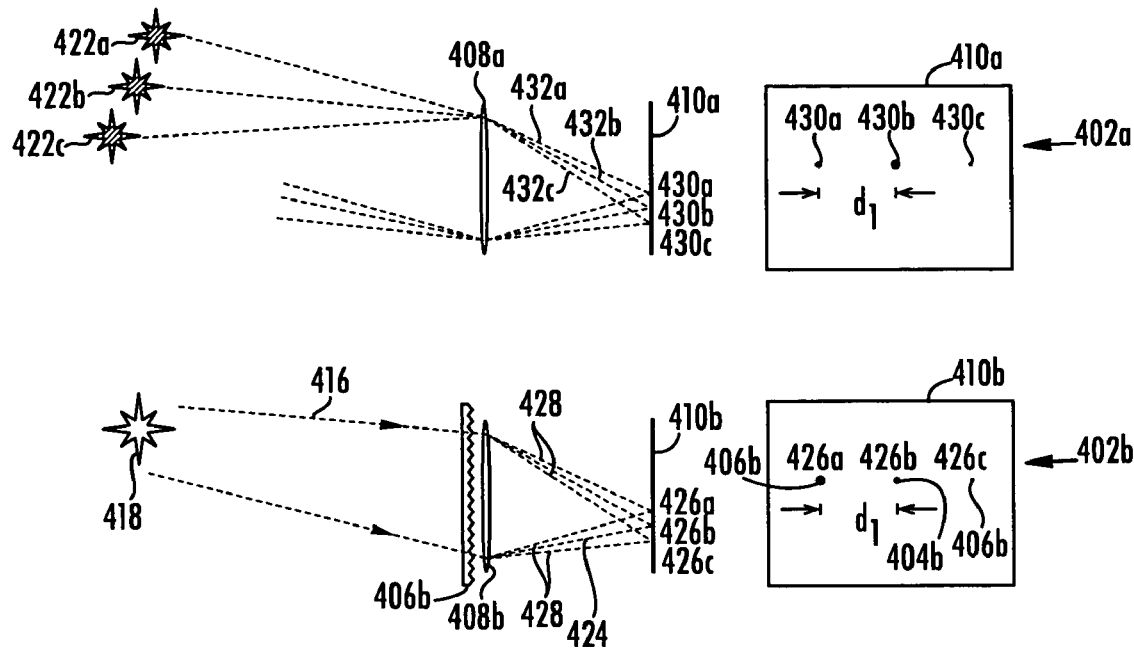
FIG. 4 depicts a detection of a true diffraction profile of interest compared to a false detection of the same diffraction profile of interest.
Figure 5:
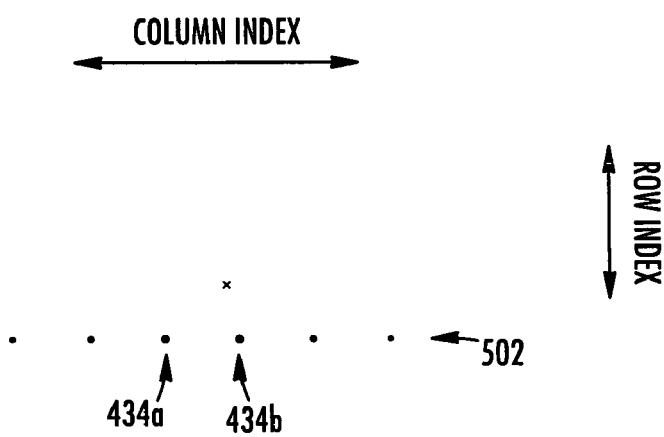
FIG. 5 depicts an exemplary diffraction profile created by a narrowband source, thereby illustrating the difficulty associated with accurately identifying the $0^{th}$ order ray thereof.

Such techniques of detecting specific, predetermined DPIs mitigate the likelihood of false detections that may be caused by optical clutter (i.e., other optical sources providing radiation to CDS 100 that are not of interest). Such techniques are particularly useful when detecting DPIs, especially dim DPIs, in environments having a large quantity of optical clutter (e.g., solar radiation). For example, such techniques are useful when detecting a weak narrowband source in the presence of a bright solar background. That is, the distinct linear arrangement of the diffracted ray spots of the DP generated by the diffraction of weak narrowband source may be distinguished from the diffracted ray streaks generated by the bright solar background. However, such techniques are susceptible to false DPI detections. The accuracy of estimating the two-dimensional AOI of a desired optical source located in an environment with a high quantity of optical clutter hinges upon: (1) the accuracy of correctly identifying a DPI, and (2) the accuracy of identifying the correct $0^{th}$ order pixel within the DPI once the DPI has been detected. FIGS. 4 and 5 illustrate examples of the common errors that can occur during estimation of the two-dimensional AOI.

Turning now to FIG. 4, depicted is an example of one method of incorrectly identifying a desired DPI. FIG. 4 depicts actual DP 402b, which is a DPI generated by a narrowband optical source 418, and false DP 402a, which is a false DP generated by a plurality of broadband optical sources 422a-422c. DP 402b, as depicted on detector 410b, includes $0^{th}$ order ray segment 404b, which is generated by $0^{th}$ order ray 424 after it passes through grating 406b and lens 408b and strikes detector 410b at location 426b. Similarly, DP 402b, as depicted on detector 410b, includes diffracted ray segments 406b in the form of diffracted ray spots (since optical source 418 is a narrowband source), which are generated by the diffracted rays 428 created by radiation 416 passing through grating 406b. Diffracted rays 428 also pass through lens 408b and strike detector 410b at locations 426a and 426c. Consequently, the resulting DP 402b is a true DP having a $0^{th}$ order ray segment 404b approximately centrally located between diffracted ray segments 406b.

In contrast, DP 402a, as depicted on detector 410a, includes three $0^{th}$ order ray segments 430a through 430c, which are generated by $0^{th}$ order rays 432a through 432c, respectively, of optical sources 422a-422c, respectively, after they pass through lens 408a and strike detector 410a at locations 430a through 430c, respectively. That is, none of $0^{th}$ order ray segments 430a through 430c represent diffracted rays, and, therefore, DP 402a is not a true DP. However, $0^{th}$ order ray segments 430a through 430c have spot-like features that simulate the true DP 402b. Consequently, a feature extraction algorithm searching for the DP 402b could identify DP 402a as the DPI despite the fact that DP 402a is generated by three broadband optical sources 422a-422c rather than the desired single narrowband source 418. Such false detection is further caused by the approximately equal distances $d_1$ between $0^{th}$ order ray segments 430a and 430b and between diffracted ray segment 406b and $0^{th}$ order ray segment 406a. Although this example has been discussed relative to broadband optical sources, other optical clutter such as, but not limited to, solar reflections of shiny objects, manmade lights, thermal sources (including the infrared wavelengths thereof), and other optical sources may also generate misleading DP segments.

Referring next to FIG. 5, depicted is an exemplary DP 502 generated by a narrowband optical source located at a distance from a CDS such as CDS 100, wherein DP 502 is generated upon a detector such as detector 110 (FIG. 1). As discussed, $0^{th}$ order rays and diffracted rays of narrowband optical sources both result in spot-like segments within the associated DP. Consequently, as illustrated, some DP segments such as DP segments 434a and 434b are nearly identical, thereby complicating accurate detection of the $0^{th}$ order ray segment and $0^{th}$ order ray pixel. In the depicted embodiment, the row and column indices correspond to the elevation and azimuth, respectively, of the optical source from which the DP 502 has been generated. As illustrated, detection of the elevation of the optical source via proper identification of the row of the $0^{th}$ order segment is relatively straightforward, however, detection of the azimuth of the optical source depends upon the correct selection of the $0^{th}$ order segment from DP segments 434a and 434b, which are nearly identical, since each DP segment 434 corresponds to a different column.

Referring back to FIG. 1, CDS 100 improves the accuracy of detecting one or more DPIs and data corresponding to their associated $0^{th}$ order ray segment by eliminating the problems discussed above with respect to FIGS. 4 and 5. The duplicate IDS 102s allows the same optical source such as optical source 118 to generate two independent DPs. Also, the duplicate IDS 102s are configured such that grating 106a is rotated ninety degrees with respect to grating 106b and detector 110a is rotated ninety degrees with respect to detector 110b. The orthogonal orientation of the detectors 110 relative to each other causes the row and column pixel indices to vary between detector 110a and 110b. For example, if the row pixel index of detector 110a corresponds to the elevation of the two-dimensional AOI of optical source 118 and the column pixel index of detector 110a corresponds to its azimuth, then the orthogonal rotation of detectors 110 relative to each other cause the row pixel index of detector 110b to correspond to the azimuth of the two-dimensional AOI of optical source 118 and the column pixel index of detector 110a to correspond to its elevation.

Similarly, the orthogonal orientation of the gratings 106 relative to each other causes the alignment of the DP generated by the respective grating to vary between detector 110a and 110b. As depicted, if the first grating 106a creates a horizontally aligned DP, the orthogonal orientation of the second grating 106b will create a vertically aligned DP. Consequently, when both gratings 106 and detectors 110 are both orthogonally oriented, the spectral dispersion depicted by the generated DP occurs along the rows of the respective detector 110 for both DPs. However, since the column and row pixel indices of detectors 110 are different, the rows containing the same spectral information contain varying two-dimensional AOI information (i.e., elevation or azimuth information).

The generation of duplicate DPs deriving from the same optical source 118 on two orthogonally oriented independent detectors 110 eliminates and/or minimizes a first potential inaccuracy involved in correctly identifying a DPI, namely, detection of a false DP for the reasons discussed in greater detail above with respect to FIG. 4. The generation of duplicate DPs allows the feature extraction process discussed above to be programmed with the additional requirement that a positive identification of a desired DPI shall not occur unless (1) both detectors 110 detect the presence of the same DP and/or (2) both detectors 110 detect the presence of such DPs in the same row pixel indices. Requiring independent detection of the same DP by two different orthogonally oriented IDSs 102 increases the accuracy of DP identification, thereby increasing the accuracy of calculations derived therefrom such as amplitude, temperature, two-dimension AOI, etc. of optical source 118.

Figure 6:
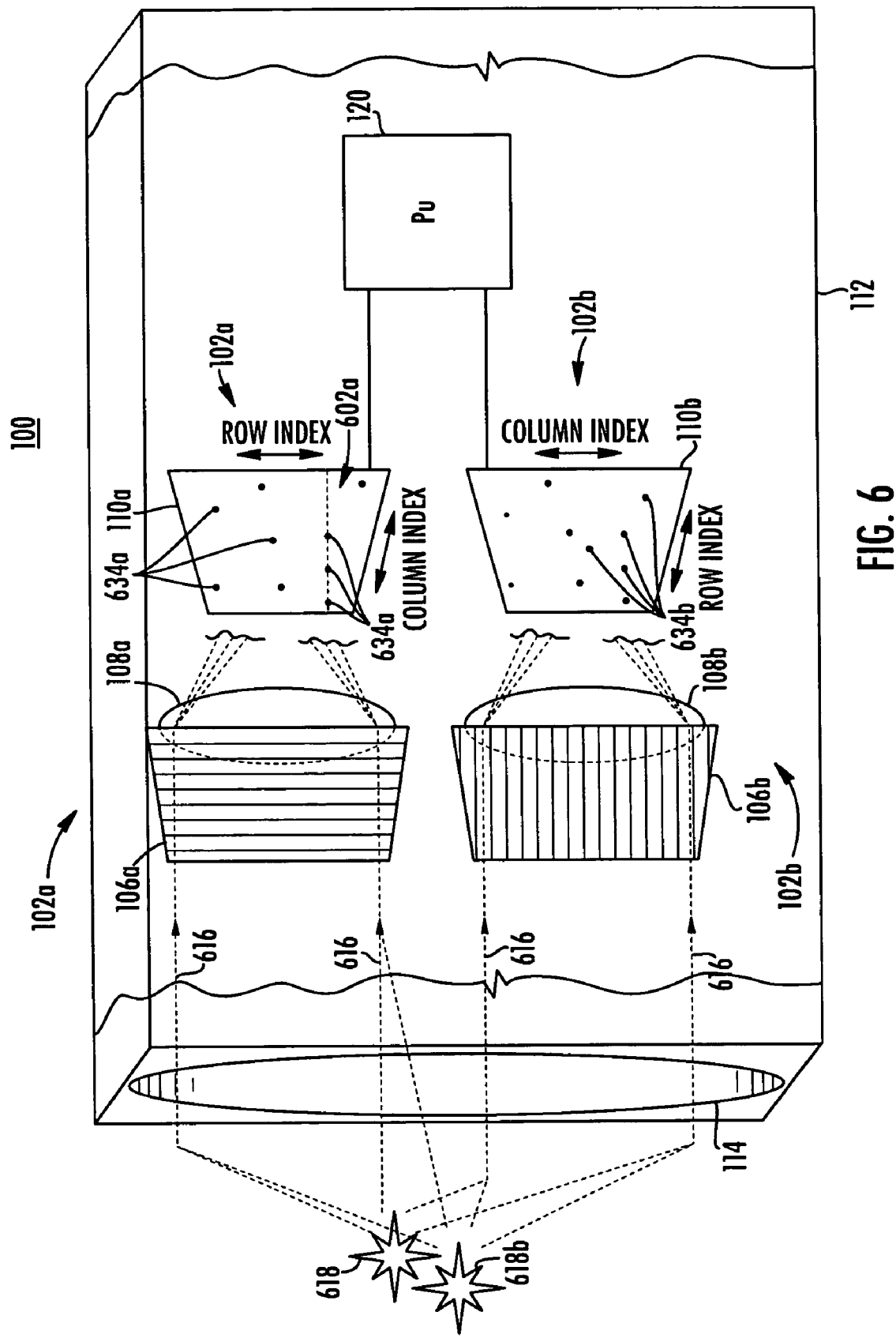
FIG. 6 depicts exemplary diffraction profile segments created from optical clutter radiation in accordance with the present invention.

Referring now to FIG. 6, the accuracy of DP identification is increased because a second grating located at an orthogonal orientation to a first grating will not duplicate a false DP created by optical clutter. When a false DP is generated on a first detector, it may be assumed that one or more optical sources that are not associated with the optical source of interest ("optical clutter sources") have aligned in a manner that produces a false DP that simulates a DPI. One such manner of producing a false DPI is discussed above with respect to FIG. 4.

FIG. 6 depicts exemplary DP segments 634 generated by optical clutter sources 618 via CDS 100, which includes orthogonally oriented detectors 10*a* and 110*b*. As depicted, a false DP 602 has been generated on detector 110*a* due to the alignment of optical clutter sources 618 in a manner that produces false DP 602. That is, optical clutter sources 618 are positioned such that the angle of arrival of radiation 616 relative to grating 106*a* causes DP segments 634 that align with the expected alignment of a DPI. For example, for detector 110*a* to detect a false DP, optical clutter sources must be positioned such that the radiation emitted therefrom strikes grating 106*a* and creates DP segments that align horizontally. Otherwise, such optical clutter will not generate a false DP since the DP segments generated therefrom do not approximate a DPI created by diffraction of the received radiation of a single optical source 118. However, the arrangement of optical clutter sources necessary to generate a false DP via a first vertical grating such as grating 106*a* in the majority of cases will not be sufficient to generate the same false DP via a second horizontal grating such as grating 106*b*. Consequently, CDS 100 will not inaccurately detect a DPI since it has been programmed to require such detection at all detectors (e.g., detectors 110*a* and 110*b*) prior to indicating that the desired DPI has been identified.

FIG. 6 depicts DP segments 634*b* generated via grating 106*b* from radiation 616 received from the same arrangement of optical clutter sources 618 that generated the false DP 602. As depicted, the horizontal orientation of grating 106*b* diffracts incoming radiation 616 horizontally rather than vertically which does not allow optical clutter sources 618 to duplicate the false DP 602, thereby revealing that optical clutter sources 618 are not the optical source of interest. That is, grating 106*b* will not receive a vertically aligned DP matching the false DP 602 unless radiation 616 is truly received from an optical source of interest. Consequently, CDS 100 will not inaccurately detect a DPI since it has been programmed to require such detection at all detectors (e.g., detectors 110*a* and 110*b*) prior to indicating that a DPI has been identified.

Furthermore, generation of duplicate DPs deriving from the same optical source 118 (FIG. 1) on two orthogonally oriented independent detectors 110 eliminates and/or minimizes a second potential inaccuracy in determining the two-dimensional AOI, namely, accurately isolating the $0^{th}$ order pixel within the potential DPI, as discussed in greater detail above with respect to FIG. 5. When implementing the systems and methods of the present invention, only the DPI, and not its $0^{th}$ order ray segment, must be identified to determine the elevation and azimuth of the optical source. When identical, or nearly identical, DPIs are identified by both detectors 110, the row corresponding to the DPI may be easily identified, as discussed above with respect to FIG. 5, for each detector 110. However, due to the orthogonal orientation of detectors 110, the row of a first detector will provide the elevation and the row of the second detector will provide the azimuth. Consequently, there is no need to delve further into the exact column that corresponds to the $0^{th}$ ray segment. The ease and accuracy of detecting the rows associated with the entire DPI, as compared to the detection of the row and column associated with a single $0^{th}$ order ray segment situated among a plurality of similar DP segments, increases the overall determination of the two-dimensional AOI of the optical source.

Figure 7:
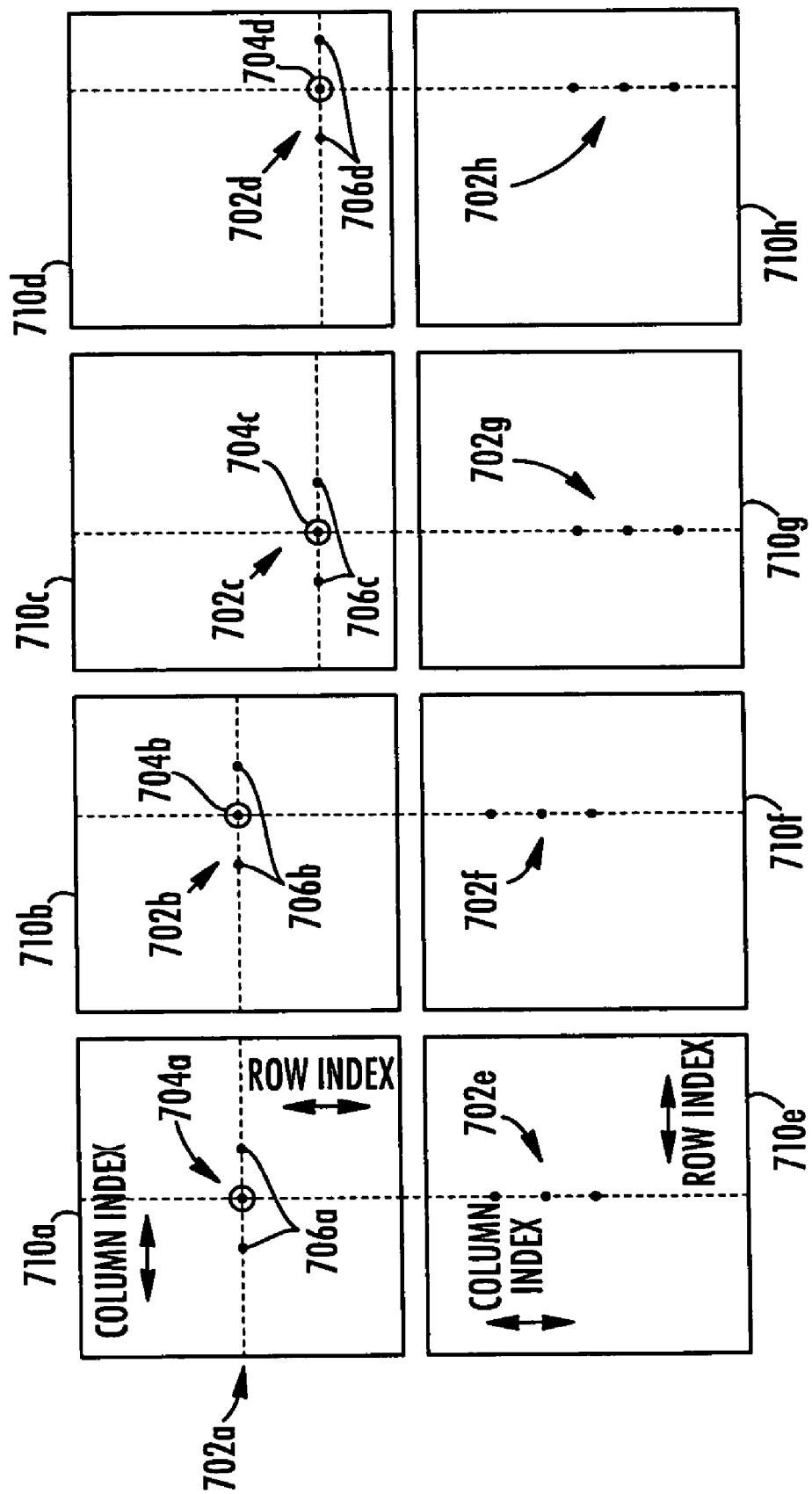
FIG. 7 depicts the impact that a change in the two-dimensional angle of incidence of an optical source of interest has on the diffraction profiles of interest generated by such optical sources in accordance with the present invention.

Referring now to FIG. 7, depicted are exemplary DPIs 702*a*-702*h* as generated upon detectors 710*a*-710*h*, respectively, wherein such DPIs illustrate the impact that a change in the two-dimensional AOI of an optical source of interest has on the DPIs generated by such optical source. DPIs 702*a*-702*d* are created by a vertically oriented grating such as grating 106*a* (FIG. 1) and DPIs 702*e*-702*h*, respectively, are the corresponding DPIs generated by a horizontally oriented grating such as grating 106*b* (FIG. 1).

Turning to the first pair of DPIs (i.e., DPIs 702*a* and 702*e*), as depicted, DPI 702*a* includes $0^{th}$ order ray segment 704*a* surrounded by diffracted ray segments 706*a*. Identification of $0^{th}$ order ray segment 704*a* allows the azimuth and elevation of the two-dimensional AOI of the optical source of interest to be determined from the corresponding row and column indices of detector 710*a* as discussed in greater detail above. However, due to the generation of duplicate DPIs (i.e., DPI 702*a* and 702*e*) via orthogonally oriented gratings, proper identification of $0^{th}$ order ray segment 704*a* is not necessary since DPI 702*e*, which is generated by diffraction of the same optical source through an orthogonally oriented grating, is vertically aligned with $0^{th}$ order ray 704*a*. Therefore, the azimuth is determined based upon the row index of detector 710*e* that corresponds with DPI 702*e*, rather than relying upon proper detection of $^{th}$ order ray 704*a*, which can be difficult to determine, and correlation to its respective column index. Similarly, detection of the elevation may be determined by the row index of DP 702*a* rather than the row index of $0^{th}$ order ray segment 704*a*.

Referring next to the second pair of DPIs (i.e., DPIs 702*b* and 702*f*), illustrated is the impact in the DPIs upon a change in the azimuth of the optical source of interest relative to its position upon creation of DPIs 702*a* and 702*e* with the elevation of the optical source remaining constant. As depicted, DPI 702*b* still corresponds to the same row index of detector 710*b*, as this row index indicates elevation, however, the change in azimuth has caused a rightward shift of the $0^{th}$ order ray segment 704*b*. Consequently, the row index corresponding to DPI 702*f*, which is generated by an orthogonally oriented grating, experiences the same rightward shift. Correlation of the row index with the new location of DPI 702*f* therefore correctly detects the proper azimuth without need for proper determination of $0^{th}$ order ray 704*b*.

Similarly, turning now to the third pair of DPIs (i.e., DPIs 702*c* and 702*g*), illustrated is the impact in the DPIs upon a change in the elevation of the optical source of interest relative to its position upon creation of DPIs 702*a* and 702*e* with the azimuth of the optical source remaining constant. As depicted, the $0^{th}$ order ray segment 704*c* corresponds to the same column index of detector 710*c*, as this column index indicates azimuth, however, the change in elevation has caused a downward shift of DPI 702*c*. Therefore, the new elevation shall be detected by correctly corresponding the new alignment of DPI 702*c* with the corresponding row index of detector 710*c*. However, since the azimuth has not changed, the row index of DPI 702*g* remains unchanged.

Finally, turning now to the fourth pair of DPIs (i.e., DPIs 702*d* and 702*h*), illustrated is the impact in the DPIs upon a change in the elevation and azimuth of the optical source of interest relative to its position upon creation of DPIs 702*a* and 702*e*. As depicted, the change in azimuth and elevation has caused a downward shift of DPI 702*d* and a rightward shift of DPI 702*h*. Therefore, the new elevation is determined by correlating the row index of detector 710*d* to the new position of DPI 702*d*, and the new azimuth is determined by correlating the column index of detector 710*h* to the new position of DPI 702*h*.

As illustrated above, duplicate DPI generation increases the accuracy of determining the two-dimensional AOI of an optical source of interest. Additionally, the row index of the orthogonally oriented detectors 710*e*-710*h* may be used not only to determine the azimuth of the optical source, but also to correctly determine the location of the $0^{th}$ order ray. Such determinations may be performed by cross-referencing the row index of the orthogonally oriented detectors 710*e*-710*h* that relates to the azimuth of the optical source of interest to the column index of the respective detector 710*a* -710*d* to determine the exact location of the $0^{th}$ order ray segment 704*a*-704*d*. Once the DPI and its respective $0^{th}$ order ray have been identified, the amplitude of optical source 118 may be calculated as discussed in greater detail above. Such proper identification also allows additional information such as temperature to be estimated based upon the DP of optical source 118 also via methods known in the art. Using the systems and methods of the present invention, the accuracy of the aforementioned calculations (e.g., amplitude, temperature, etc.) is increased due to the increased accuracy of the proper identification of the DPI and its $0^{th}$ order segment.

Referring back to FIG. 1, requiring detection of a DPI by both detectors 110*a* and 110*b* prior to indicating a positive detection of the respective DPI may be implemented in an uncorrelated or a correlated manner. When implemented in an uncorrelated manner, independent processes associated with each detector are responsible for independently identifying the DP. Thereafter, the information is compared to determine whether the same DP has been detected.

Figure 10:
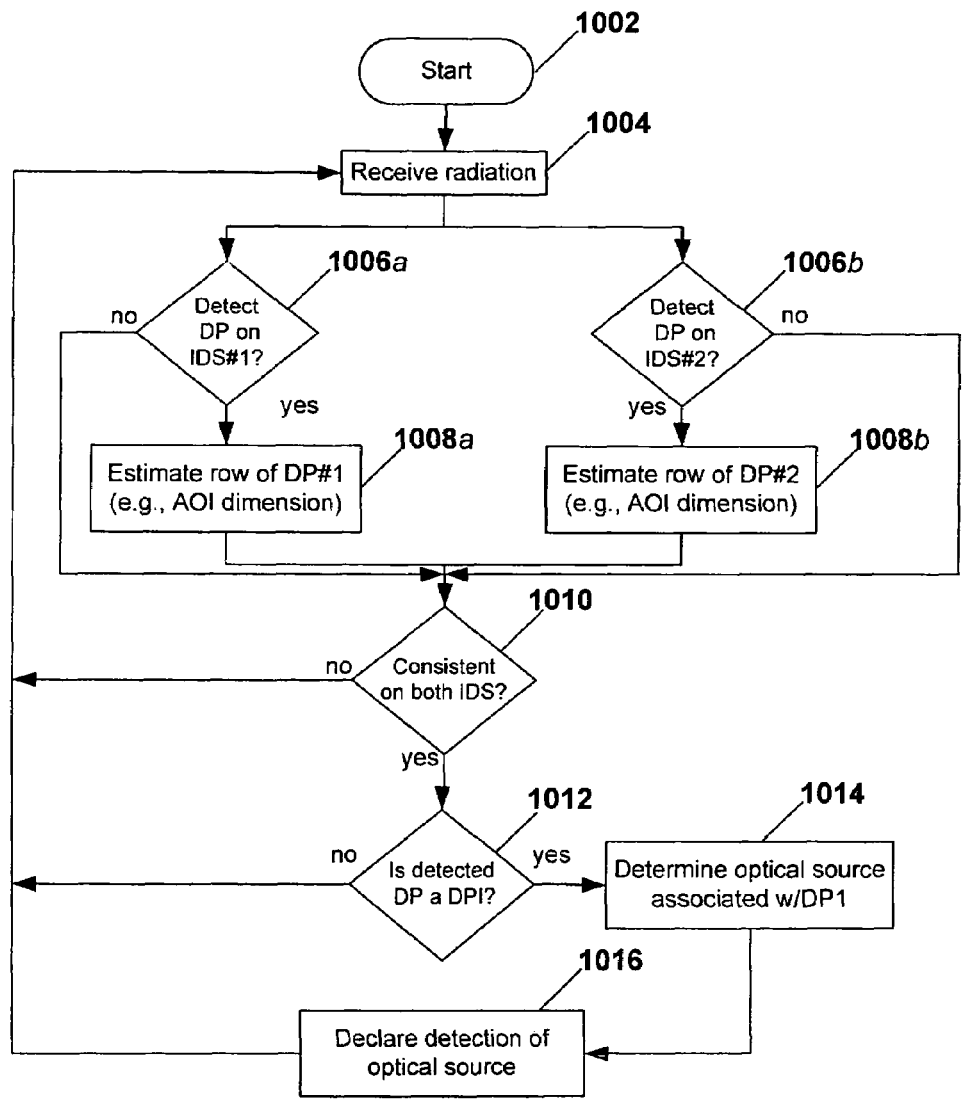
FIG. 10 depicts an exemplary process for detecting a DPI in an uncorrelated manner in accordance with one embodiment of the present invention.

Referring now to FIG. 10, depicted is an exemplary process 1000 for detecting a DPI in an uncorrelated manner. As depicted, process 1000 begins at 1002, at which a CDS such as CDS 100 is positioned to receive radiation from a scene of interest. Process 1000 then proceeds to 1004, at which radiation from a potential optical source of interest is received by a CDS such as CDS 100. Process 1000 then proceeds to 1006*a* and 1006*b*.

At 1006*a* and 1006*b*, the images generated on the detectors of IDS #1 and IDS #2, respectively, are independently analyzed to determine if a DP is present. If no DP is detected on either IDS #1 or IDS #2, process 1000 proceeds to 1010. If a DP is detected for IDS #1 and/or IDS #2, process 1000 proceeds to 1008*a* and/or 1008*b*, respectively.

At 1008*a*, the dimension represented by the row of IDS #1's detector (e.g., elevation or azimuth) is estimated by determining the row of the detector index in which the DP of IDS #1 is located as discussed in greater detail above. For example, if the row of the detector equates to elevation, the elevation of the optical source creating the received radiation may be estimated by determining the row of the detector in which the DP is located. Similarly, at 1008*b*, the dimension represented by the row of IDS #2's detector (e.g., elevation or azimuth) is estimated by determining the row of the detector index in which the DP of IDS #2 is located. In many embodiments of the present invention, such dimension will be different from the dimension estimated at 1008*a*. For example, such dimension may be the second dimension of the AOI of the optical source, wherein the first dimension has been estimated at 1008*a*. For example, if the elevation has been estimated at 1008*a*, then the azimuth may be estimated at 1008*b*, or vice versa. Process 1000 then proceeds to 1010.

At 1010, the DPs detected on IDS #1 and IDS #2 are compared to determine whether they are consistent with each other. If no, a DPI has not been detected and process 1000 returns to 1004. For example, consistency will not be found if the DP is only detected on one of the two IDSs or if the two detected DPs vary. If consistency has been determined, process 1000 proceeds to 1012, at which the detected DP is analyzed to determine whether it is a DPI. Such determination may be made via a feature extraction process or the like as discussed in greater detail above. If the detected DP is not a DPI, process 1000 returns to 1004. If the detected DP is a DPI, process 1000 proceeds to 1014, at which the optical source associated with the detected DP is determined. Such determination may be made via the use of a database, lookup table, or the like, however, the present invention is not so limited. Process 1000 then proceeds to 1016, at which detection of the optical source associated with the detected DP is declared to the user. Process 1000 then repeats by returning to 1004.

Alternatively, when these requirement(s) are implemented in a correlated manner, whenever either IDS 102 identifies a DPI, it notifies the remaining IDS 102 that a potential DPI has been detected. Such notification may optionally include information about the potential DPI such as name of the DPI, row and/or column location upon the detecting detector 110, wavelength information, spectral information, location or classification information relating to the optical source from which the potential DPI is derived, etc. The notified IDS 102 may then utilize the received information to search for the particular DPI of interest or elements thereof. Such search is implemented via a dedicated algorithm executed by PU 120 or the like.

Figure 11:
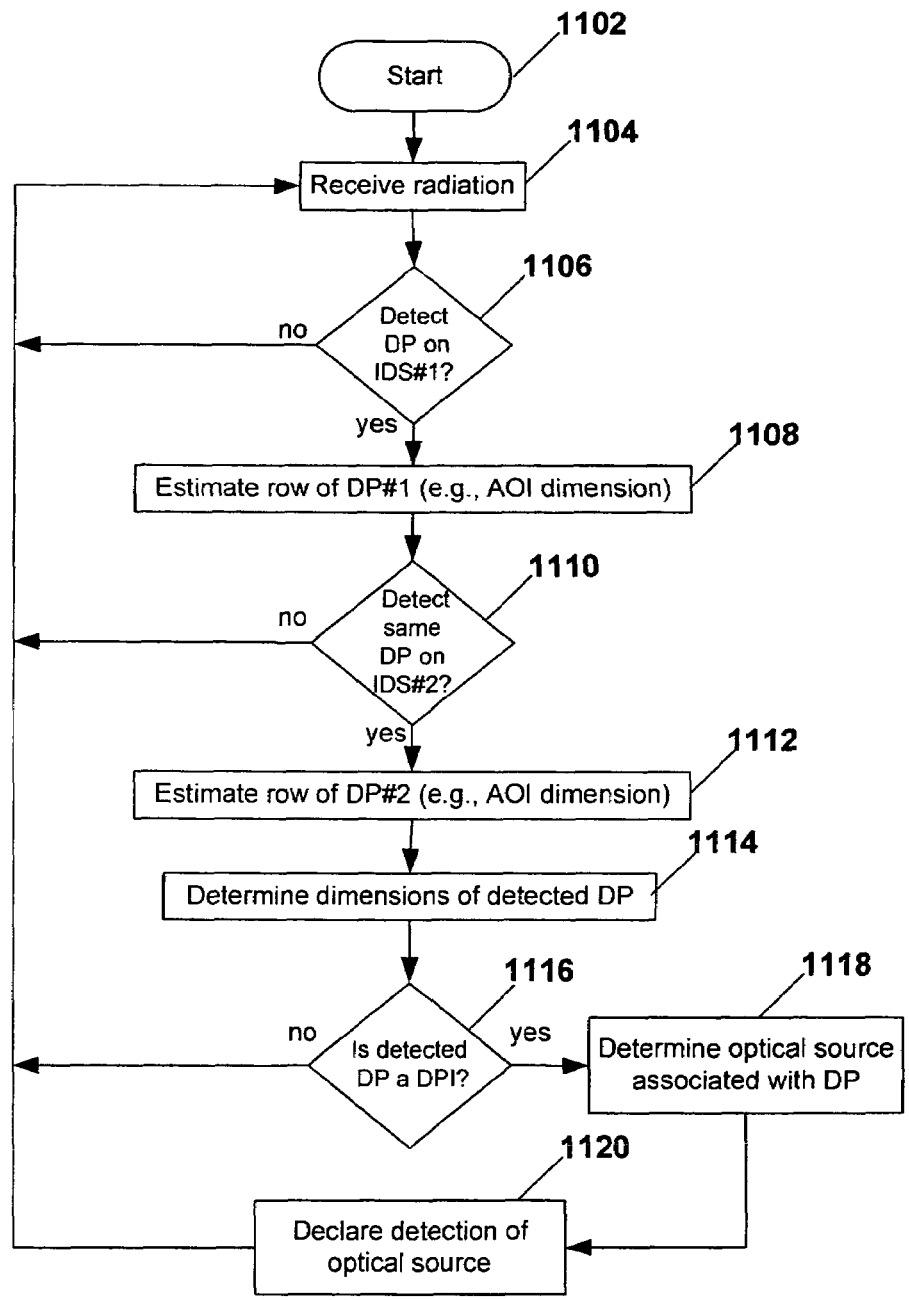
FIG. 11 depicts an exemplary process for detecting a DPI in a correlated manner in accordance with one embodiment of the present invention.

Turning now to FIG. 11, depicted is an exemplary process 1100 for detecting a DPI in a correlated manner. As depicted, process 1100 begins at 1102, at which a CDS such as CDS 100 is positioned to receive radiation from a scene of interest. Process 1100 then proceeds to 1104, at which radiation from a potential optical source of interest is received by a CDS such as CDS 100. Process 1100 then proceeds to 1106.

At 1106, the image generated on the detector of IDS #1 of the CDS is analyzed to determine if a DP is present. If no DP is detected, process 1100 returns to 1104. If a DP is detected by IDS #1, process 1100 proceeds to 1108, at which the dimension represented by the row of IDS #1's detector (e.g., elevation or azimuth) is estimated by determining the row of the detector index in which the DP of IDS #1 is located as discussed in greater detail above. For example, if the row of the detector equates to elevation, the elevation of the optical source creating the received radiation may be estimated by determining the row of the detector in which the DP is located. Process 1100 then proceeds to 1110.

At 1110, the image generated on the detector of IDS #2 of the CDS is analyzed to determine if a DP is present and, if yes, whether it is the same DP detected by IDS #1. If no DP is detected or the DP varies from that detected by IDS #2, process 1100 returns to 1104. If a DP is detected by IDS #2, process 1100 proceeds to 1112, at which the dimension represented by the row of IDS #2's detector (e.g., elevation or azimuth) is estimated by determining the row of the detector index in which the DP of IDS #2 is located. In many embodiments of the present invention, such dimension will be different from the dimension estimated at 1108. For example, such dimension may be the second dimension of the AOI of the optical source, wherein the first dimension has been estimated at 1108. For example, if the elevation has been estimated at 1108, then the azimuth may be estimated at 1112, or vice versa. Process 1100 then proceeds to 1114.

At 1114, the dimensions estimated at 1108 and 1112 are combined to determine the complete dimensions of the detected DP, and process 1100 proceeds to 1116. At 1116, the detected DP is analyzed to determine whether it is a DPI. Such determination may be made via a feature extraction process or the like as discussed in greater detail above. If the detected DP is not a DPI, process 1100 returns to 1104. If the detected DP is a DPI, process 1100 proceeds to 1118, at which the optical source associated with the detected DP is determined. Such determination may be made via the use of a database, lookup table, or the like, however, the present invention is not so limited. Process 1100 then proceeds to 1120, at which detection of the optical source associated with the detected DP is declared to the user. Process 1100 then returns to 1104.

Additionally, in one aspect of the present invention, IDS 102a and IDS 102b are co-aligned such that the field of view ("FOV") of each IDS 102 overlaps. However, although their FOVs overlap, because IDS 102a and IDS 102b receive different radiation rays 116 from optical source 118, the IDS 102s do not image the exact same scene. Practically, the lack of exact alignment of the FOV of the IDS 102s may be insignificant, particularly when optical source 118 is located at a far distance from CDS 100. However, such a lack of alignment may become significant when CDS 100 is used to sense optical sources in areas experiencing atmospheric turbulence, as such turbulence can cause scintillation (i.e., flashes of light produced in a phosphor by an ionizing event). Scintillation may result in varying signal amplitudes (i.e., such amplitudes may vary by factors of one hundred or one thousand) between radiation 116 received by each IDS 102, even if the IDS 102s are only separated by a few centimeters. Such variance can lead to a failure of CDS 100 to properly detect a DPI as the weaker radiation of the individual radiations received by each IDS 102s may be too weak to produce a DPI adequate for detection. Therefore, CDS 100 will not properly detect the DPI since it does not have confirmation of same from both IDS 102s.

Figure 8:
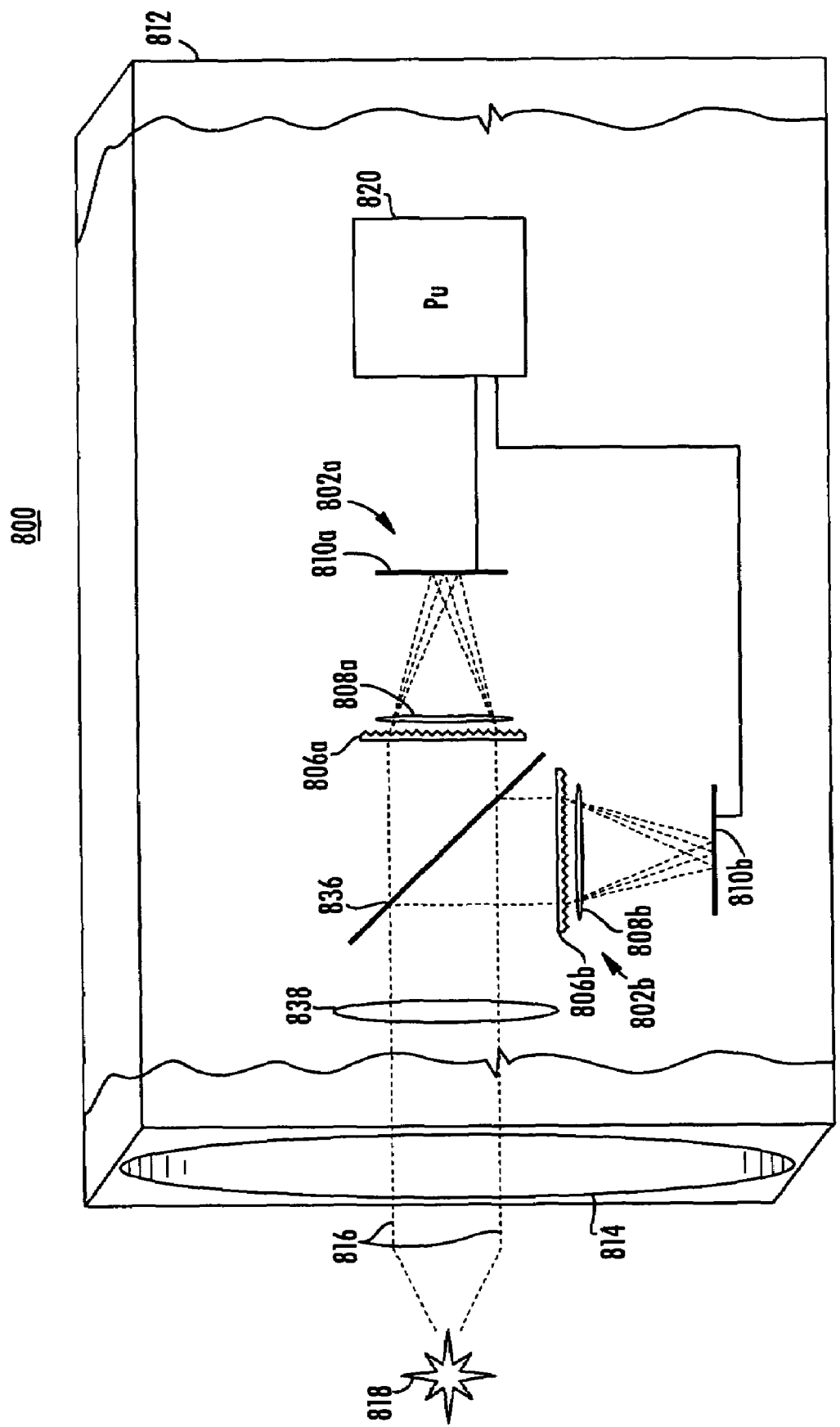
FIG. 8 depicts an exemplary apparatus for locating and classifying optical radiation in accordance with one alternate embodiment of the present invention.

Turning now to FIG. 8, depicted is CDS 800, which is an alternate embodiment in accordance with the present invention. Such embodiment may be useful to counteract the problems caused during detection of DPIs generated by optical sources located in environments experiencing atmospheric turbulence, however, the use of alternate embodiments such as CDS 800 is not so limited.

In the exemplary embodiment of the present invention depicted in FIG. 8, CDS 800 includes, inter alia, afocal lens 838, first IDS 802a, and second IDS 802b. In some aspects of the present invention, such as the embodiment depicted in FIG. 8, IDS 802b is orthogonally oriented relative to IDS 802a. That is, IDS 802b is rotated ninety degrees about the optical axis with respect to IDS 802a. In some embodiments of the present invention, both grating 806b and detector 810b are rotated ninety degrees with respect to grating 806a and detector 810a, respectively. That is, the diffracted radiation created by a first grating 806a is rotated ninety degrees relative to the diffracted radiation created by a second grating 806b. Also, the indexing system of a first detector 810a is rotated ninety degrees relative to the indexing system of a second detector 810b. However, varying quantities and/or orientations of IDS 102 may be substituted without departing from the scope of the present invention.

CDS 800, as well as other embodiments of the present invention such as CDS 100 as described above with respect to FIG. 1, may optionally include afocal lens 838. Afocal lens 838 is preferably located in the field of the incoming radiation such that it receives the radiation before it is received by the gratings such as gratings 806. Such positioning allows afocal lens 838 to focus the received radiation onto beamsplitter 836, if included, or directly onto gratings such as gratings 106 (FIG. 1), 806, and the like. Afocal lens 838 may be included in the CDS when it will be used to image wide fields of views, however, it may also be used for other applications without departing from the scope of the present invention.

As depicted in FIG. 8, each exemplary IDS such as IDS 802a and 802b may include, inter alia, grating 806, lens 808, detector 810, and a dedicated or shared processing unit ("PU") 820. Also, each IDS 802 and its respective components may be contained within a dedicated or shared housing such as housing 812 having an aperture 814 through which optical radiation may pass prior to collection by IDS 802a and IDS 802b.

The types of gratings used for gratings 806 are as discussed above with respect to gratings 106. IDS 802s also each include a lens 808 and detector 810. Such lenses and detectors are similar to those discussed above with respect to lens 108 and detector 110. Similarly, detectors 810 are in communication with PU 820, which is similar to, and performs similar functions to, PU 120 as discussed in greater detail above.

However, gratings 806a and 806b receive identical incoming radiation 816, as generated by one or more optical sources such as optical source 818, through aperture 814 via incorporation of beamsplitter 836. Beamsplitter 836 may be a pellicle, plate, or cube. Additionally, beamsplitter 836 may be a 50/50 beamsplitter (i.e., a beamsplitter that splits the incoming radiation equally) or it may split the light based upon spectral region (e.g., a dichroic beamsplitter) or polarization to enhance particular features of the DP. However, alternate beamsplitters may be substituted without departing from the scope of the present invention. Use of beamsplitter 836 ensures that each IDS 802 simultaneously views the exact same optical source 818 and that such views are exactly aligned. Such exact alignment minimizes or eliminates the problems associated with non-aligned views since any optical source 818 that is bright enough to be detected on a first IDS 802 will be bright enough to be detected on the remaining IDS 802 due to receipt by both IDS 802s of the exact same view. However, alternate embodiments of the present invention without beamsplitters, such as that discussed with respect to FIG. 1, are also envisioned in accordance with the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for determining information related to one or more optical sources comprising:
    at least two gratings for diffracting radiation received from said optical source, for which a first of said gratings is oriented relative to a second of said gratings such that said diffracted radiation created by a first of said gratings is rotated ninety degrees relative to said diffracted radiation created by a second of said gratings;
    at least two lenses, each of said lenses positioned to receive said diffracted radiation created by a respective one of said at least two gratings;
    at least two detectors, each of said detectors positioned to receive said diffracted radiation passing through a respective one of said at least two lenses; and at least one processing unit coupled to said at least two detectors for receiving data related to said diffracted radiation received by said at least two detectors and performing at least one of the group consisting of locally processing said data, transmitting said data for remote processing, recording said data for remote processing, and combinations thereof;

wherein a first indexing system of a first of said detectors is rotated ninety degrees relative to a second indexing system of a second of said detectors.

2. An apparatus for determining information related to one or more optical sources comprising:

at least two gratings for diffracting radiation received from said optical source, for which a first of said gratings is oriented relative to a second of said gratings such that said diffracted radiation created by a first of said gratings is rotated ninety degrees relative to said diffracted radiation created by a second of said gratings;

at least two lenses, each of said lenses positioned to receive said diffracted radiation created by a respective one of said at least two gratings;

at least two detectors, each of said detectors positioned to receive said diffracted radiation passing through a respective one of said at least two lenses;

at least one processing unit coupled to said at least two detectors for receiving data related to said diffracted radiation received by said at least two detectors and performing at least one of the group consisting of locally processing said data, transmitting said data for remote processing, recording said data for remote processing, and combinations thereof; and at least one beamsplitter for directing an equal amount of said radiation received from at least one of the group consisting of said optical source, an afocal lens, and combinations thereof to each of said at least two gratings.

3. A method for determining information related to one or more optical sources comprising the steps of:

diffracting radiation received from said optical source via at least two gratings, for which a first of said gratings is oriented relative to a second of said gratings such that said diffracted radiation created by a first of said gratings is rotated ninety degrees relative to said diffracted radiation created by a second of said gratings;

transmitting said diffracted radiation onto at least two detectors, for which a first indexing system of a first of said detectors is rotated ninety degrees relative to a second indexing system of a second of said detectors; and analyzing data related to said diffracted radiation received by said at least two detectors to determine if one or more diffraction profiles of interest are present.

4. A method according to claim 3 further comprising:
comparing said data related to said diffracted radiation received by a first of said at least two detectors with said data related to said diffracted radiation received by a second of said at least two detectors to determine if at least one of said diffraction profiles of interest are present on both said first and said second detector.

5. A method according to claim 3 further comprising:
analyzing said data related to said diffracted profiles of interest to determine at least one of the group consisting of an elevation of a two-dimensional angle of incidence of at least one of said optical sources, an azimuth of a two-dimensional angle of incidence of at least one of said optical sources, a positive detection of an optical source of interest, and combinations thereof.

6. A method according to claim 3 further comprising:
calculating at least one of the group consisting of a wavelength of said optical source of interest, an amplitude of said optical source of interest, and combinations thereof from said diffraction profile of interest.

7. A method according to claim 3 further comprising:
directing an equal amount of said radiation received from said optical source to said gratings prior to said diffracting.

8. A method according to claim 3 further comprising:
focusing said radiation received from said optical source via an afocal lens prior to said diffracting.

9. A method according to claim 3, wherein said gratings are at least one of the group consisting of a ruled transmission grating, a holographic linear transmission grating, and combinations thereof.

10. A method according to claim 3, wherein said detector is a focal plane array.

11. A method according to claim 3, wherein said optical source is a laser.

12. A method according to claim 3, wherein said information includes at least one of the group consisting of classification of said optical source, location of said optical source, and combinations thereof.

13. A method according to claim 3, wherein said data includes at least one of the group consisting of wavelength data, angle of incidence data, elevation data, azimuth data, amplitude data, time data, diffraction profile data, and combinations thereof.

14. A method according to claim 3, wherein said diffracted radiation received by said detectors creates a diffraction profile specific to said detector.

15. A method according to claim 14,
wherein said first and second indexing systems include row and column indices;
wherein said row index of said first of said detectors correlates said first diffraction profile of said first of said detectors to an elevation of said optical source from which said first diffraction profile is derived;
wherein said row index of said second of said detectors correlates said second diffraction profile of said second of said detectors to an azimuth of said optical source from which said second diffraction profile is derived; and
wherein said elevation and said azimuth determine a two-dimensional angle of incidence of said optical source from which said first diffraction profile and said second diffraction profile are derived.

16. A method according to claim 14, wherein said method indicates detection of an optical source of interest whenever a first diffraction profile of a first of said detectors matches a second diffraction profile of a second of said detectors.

17. A method according to claim 16, wherein said matching is at least one of the group consisting of correlated and uncorrelated.

18. A method according to claim 3, wherein said gratings are co-aligned such that a field of view of each of said gratings overlap.

* * * * *